United States Patent [19]

Schoess

[11] Patent Number: 5,243,544
[45] Date of Patent: Sep. 7, 1993

[54] MICROGRAVITY ACCELEROMETER DATA ACQUISITION SYSTEM

[75] Inventor: Jeffrey N. Schoess, Buffalo, Minn.

[73] Assignee: Honeywell Inc., Minneapolis, Minn.

[21] Appl. No.: 637,601

[22] Filed: Jan. 2, 1991

[51] Int. Cl.$^5$ .............................................. G01C 19/56
[52] U.S. Cl. ..................................... 364/566; 73/514; 73/517 B
[58] Field of Search ............... 364/566, 434, 559, 453; 73/510, 517 R, 178 R, 517 B, 517 A, 518

[56] References Cited

U.S. PATENT DOCUMENTS

| | | | |
|---|---|---|---|
| 3,974,699 | 8/1978 | Morris et al. | 73/510 |
| 4,280,188 | 7/1981 | Weinstein et al. | 364/566 |
| 4,336,497 | 6/1982 | Woodhouse et al. | 324/162 |
| 4,445,376 | 5/1984 | Merhav | 73/510 |
| 4,522,062 | 6/1985 | Peters | 73/505 |
| 4,799,385 | 1/1989 | Hulsing | 73/505 |
| 5,050,087 | 9/1991 | Walrath et al. | 364/434 |

Primary Examiner—Thomas G. Black
Attorney, Agent, or Firm—John G. Shudy, Jr.

[57] ABSTRACT

Accelerometer apparatus for a space vehicle includes sensors for sensing accelerations on board the vehicle which provide accelerometer input signals. Interface circuits are coupled to receive the accelerometer input signals and attenuate DC bias and remove alias frequencies from the accelerometer input signal while providing a filtered accelerometer signal at an interface output. Coupled to the interface output is a circuit for converting the filtered accelerometer signal to a known frequency pulse output including a charge rebalance digitizer which converts the filtered accelerometer signal to impulse data for each accelerometer axis. The impulse data comprises the time integral of the acceleration data and is representative of total energy of a gravitoinertial disturbance.

20 Claims, 7 Drawing Sheets

MICROGRAVITY ACCELEROMETER DATA ACQUISITION SYSTEM

FIELD OF THE INVENTION

The present invention relates generally to accelerometer apparatus and, more particularly, to a microgravity accelerometer data acquisition system for monitoring oscillatory and transient accelerations on board spacecraft.

BACKGROUND OF THE INVENTION

Quantitative knowledge of the gravitoinertial environment is critical to many materials processing, fluids physics, and biotechnology space experiments. The need for high-quality three dimensional acceleration measurement is increasing on Space Shuttle missions, for example. The challenge for space experiment support is to provide access to acceleration data and produce data products which are useful to microgravity experimenters. Making accelerometer measurements as part of space flight experiments is not as straight forward as recording a simple time series of triaxial accelerations for flight investigators. In order to be useful, many experiments require the derivation of information from acceleration data in condensed and accessible forms.

The detection of large acceleration events due to external gravitoinertial disturbances, the frequency distribution of these disturbance events, and their data representation are key parameters of interest in materials processing applications. Gravitoinertial disturbances due to crew motion effects (e.g., treadmill activity, payload interaction, etc.) and mechanical anomalies such as the cycling of fans and pumps can have a significant impact on the growth of uniform crystalline structures, for example.

The microgravity environment refers to the forces experienced by a unit mass at a specific location on a space vehicle. There are two components of acceleration that make up the microgravity environment. One class of accelerations is called slowly varying or quasi-steady-state accelerations. These are also frequently referred to as "background" accelerations, and sources include gravity gradients, aerodynamic drag, and low-frequency spacecraft rotation.

A second class of accelerations is known as oscillating or transient accelerations. These are frequently referred to a "g-jitter" and represent time-varying accelerations that result from such factors as crew activity, propulsion and attitude control systems, experiment operations, and communications. In normal low earth orbit operations, the g-jitter component dominates the background acceleration environment in an orbiting craft and is believed to have the greatest impact on many materials processes.

Under normal Earth gravity conditions, buoyancy effects (lower density material rises, higher density material falls) can create significant convection and phase separation in the liquid state that are known to create imperfections and nonuniformities in certain materials. In the microgravity environment of space, this natural convective mixing and separation of materials of differing density is greatly suppressed, allowing for the production of novel materials that cannot be manufactured on the ground. In addition, microgravity scientists are better able to investigate subtle effects such as diffusion-controlled mixing or surface tension gradient induced mixing (known as Marangoni flow) that are normally masked on Earth by the larger, dominating buoyancy convection mixing effect.

Examples of how this unique environment is being used include growth of larger, more perfect semiconductor crystals for advanced electronics applications; production of light weight, unique 2-phase composite materials that cannot be produced on Earth; and growth of larger protein crystals from which detailed structural information can be obtained that might prove useful in the production of future disease-fighting drugs.

As these applications mature and as other applications are discovered, there will be a growing need to measure and quantify the exact microgravity conditions under which experiments are performed. The present invention was particularly designed and developed to support scientists who require detailed information on the microgravity environment in space.

SUMMARY OF THE INVENTION

An accelerometer apparatus is provided including sensor means for sensing accelerations on board a vehicle wherein the sensor means provides an accelerometer input signal. An interface means is coupled to receive the accelerometer input signal. The interface means attenuates DC bias and removes alias frequencies from the accelerometer input signal. The interface means further provides a filtered accelerometer signal at an interface output. Coupled to the interface output is a means for converting the filtered accelerometer signal to a known frequency pulse output. The converting means includes a charge rebalance digitizer means wherein the charge rebalance digitizer means converts the filtered accelerometer signal into impulse data for each accelerometer axis. An impulse is defined as the "time integral of the acceleration for the duration of a gravitoinertial disturbance event." Thus, the impulse data is equivalent to the total energy (or strength) of the gravitoinertial disturbance being sensed by the accelerometers.

In one example of an accelerometer apparatus as provided by the present invention, three pendulous force balanced accelerometers are oriented in coordinates X, Y and Z. The operating principle of each sensor is based on the movement of a proof mass due to external disturbance forces. A servo amplifier measures the position of the proof mass as a change in capacitance, and it outputs a current proportional to the acceleration. A current output is used in a closed loop to rebalance the proof mass to its neutral position. In one embodiment, the electrical design of the accelerometer apparatus comprises three accelerometers wherein each accelerometer has a different sensing orientation located along the X, Y or Z coordinate axes, three-pole anti-alias filtering electronics, three high-accuracy charge rebalance digitizers individually interfaced with the X, Y and Z oriented accelerometers, a measurement and control computer (MCC), and an EIA standard RS 422 computer interface. The purpose of each digitizer is to convert the filtered accelerometer data to a known frequency pulse output. The MCC receives the frequency pulse output. The MCC advantageously may be a low powered eight bit microcomputer that samples and accumulates digitizer pulses, checks the data for reasonability, and outputs the accelerometer data in a serial communication format to the RS 422 input/output I/O interface for data archival storage.

Other objects, features and advantages of the present invention will become apparent to those skilled in the art through the Description of the Preferred Embodiment, claims, and drawings herein wherein like numerals refer to like elements.

DESCRIPTION OF THE PREFERRED EMBODIMENT

For the purposes of explaining the invention, it is largely described hereinbelow by means of an example of a three coordinate system. This example is meant for illustration of the invention and it should not be considered so limited. For example, the invention may also be advantageously implemented in one or two axis configuration for certain applications.

Figure 1:
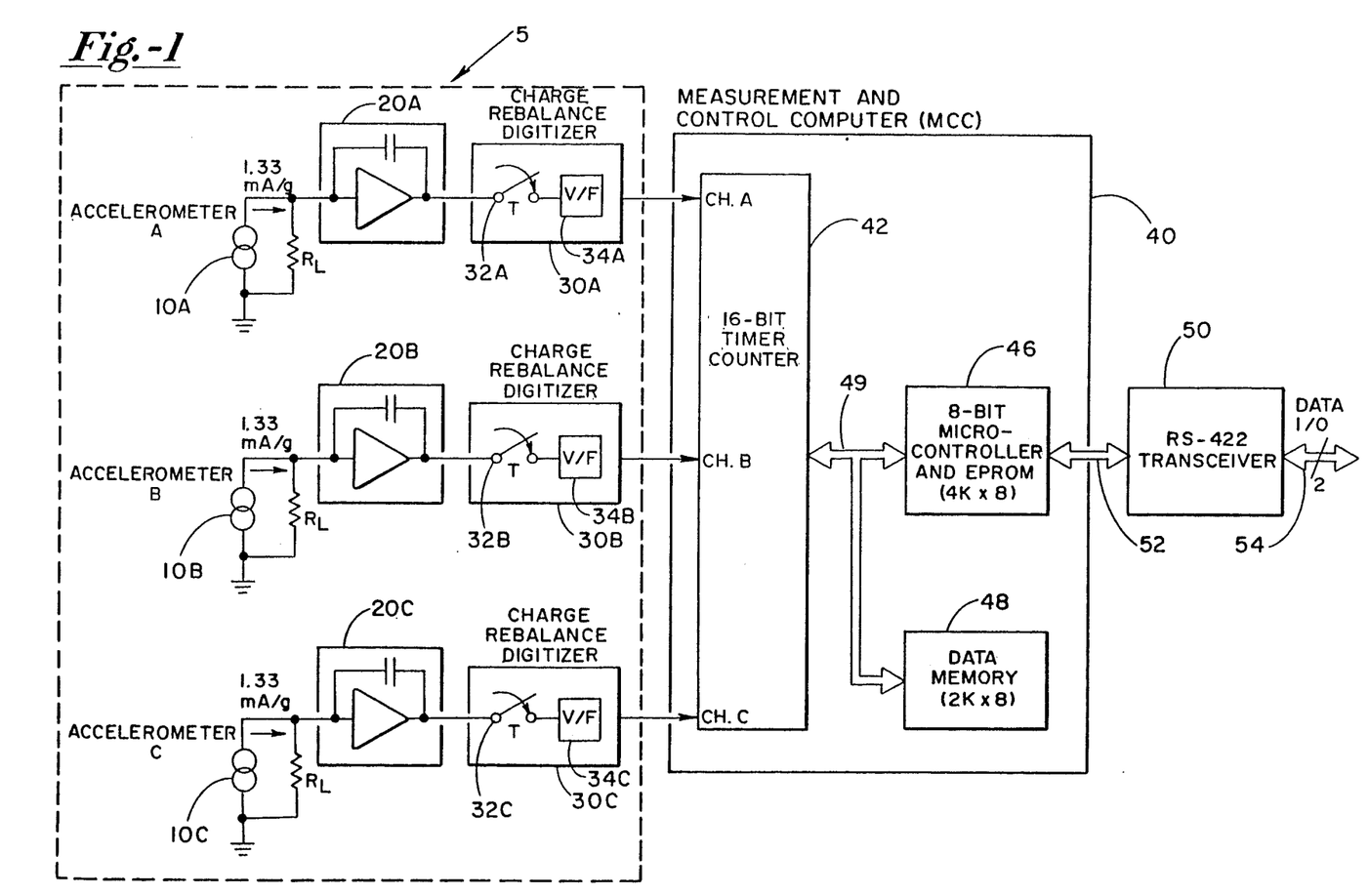
FIG. 1 is a simplified functional block diagram of one example of an embodiment of the accelerometer apparatus of the invention.

Referring now to FIG. 1, a simplified functional block diagram of one example of an embodiment of the accelerometer apparatus of the invention is shown. Included are an analog section 1 and a measurement and control computer (MCC) 40. The apparatus includes three accelerometers 10A, 10B and 10C. Each accelerometer is oriented orthogonally to the others in X, Y and Z coordinates, respectively. The accelerometers are functionally shown as current sources each having an associated loading resistor $R_L$. In one example of the invention, three Sunstrand Q-Flex Model QA-2000 pendulous forced balanced accelerometers were employed. These accelerometers were configured to output a current signal scaled at 1.33 milliamps per g. Each of the three coordinate axes were processed in a parallel channel. Therefore, there are three third order band pass filters 20A, 20B and 20C, respectively coupled to the outputs of the accelerometers. The outputs of the third order band pass filters, also called anti-aliasing filters herein, are respectively routed to three charge rebalance digitizers 30A, 30B and 30C. The charge rebalanced digitizers are each comprised of a sampling circuit functionally represented by functional switches 32A, 32B and 32C and a voltage-to frequency converter shown as 34A, 34B and 34C. The outputs of the voltage-to-frequency converters are routed to the measurement and control computer 40. The measurement and control computer includes a 16 bit timer/counter 42, bus 49, a microcontroller 46 and a data memory 48. The microcontroller 46 is further coupled by means of a second bus 52 to a transceiver 50. The transceiver 50 includes a data input/output (I/O) port 54. In one example of the invention the transceiver 50 may preferably be an RS-422 transceiver and the microcontroller may preferably be an 8 bit microcontroller and erasable PROM with 4K×8 memory. In one embodiment of the invention called the Honeywell In Space Accelerometer (HISA), an Intel Corporation Model 87C51 microcontroller was employed. The data memory in one example embodiment included 2K×8 data memory capacity.

Figure 2A:
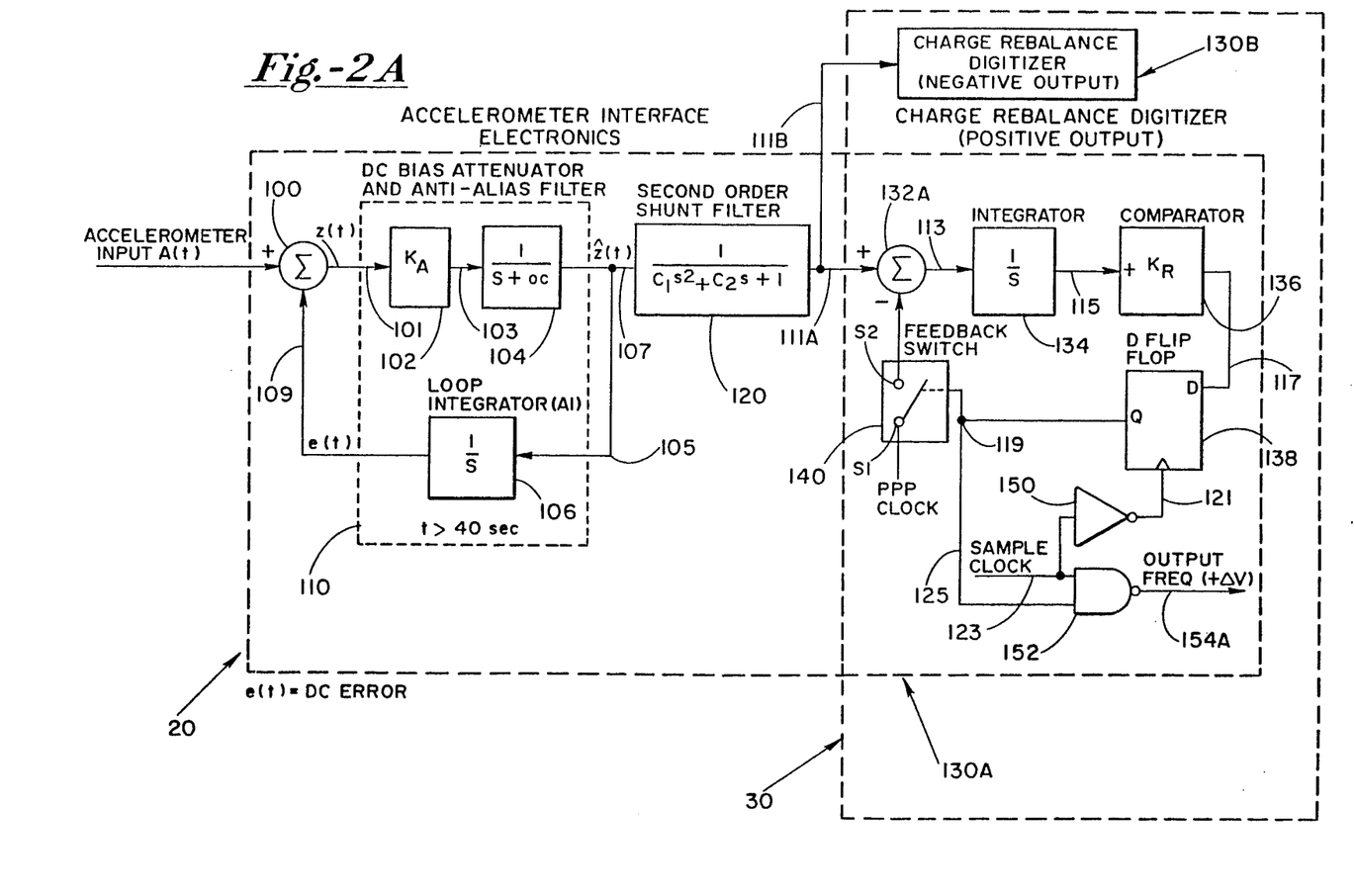
FIGS. 2A and 2B are frequency domain functional block diagrams illustrating one embodiment of the apparatus of the invention.
Figure 2B:
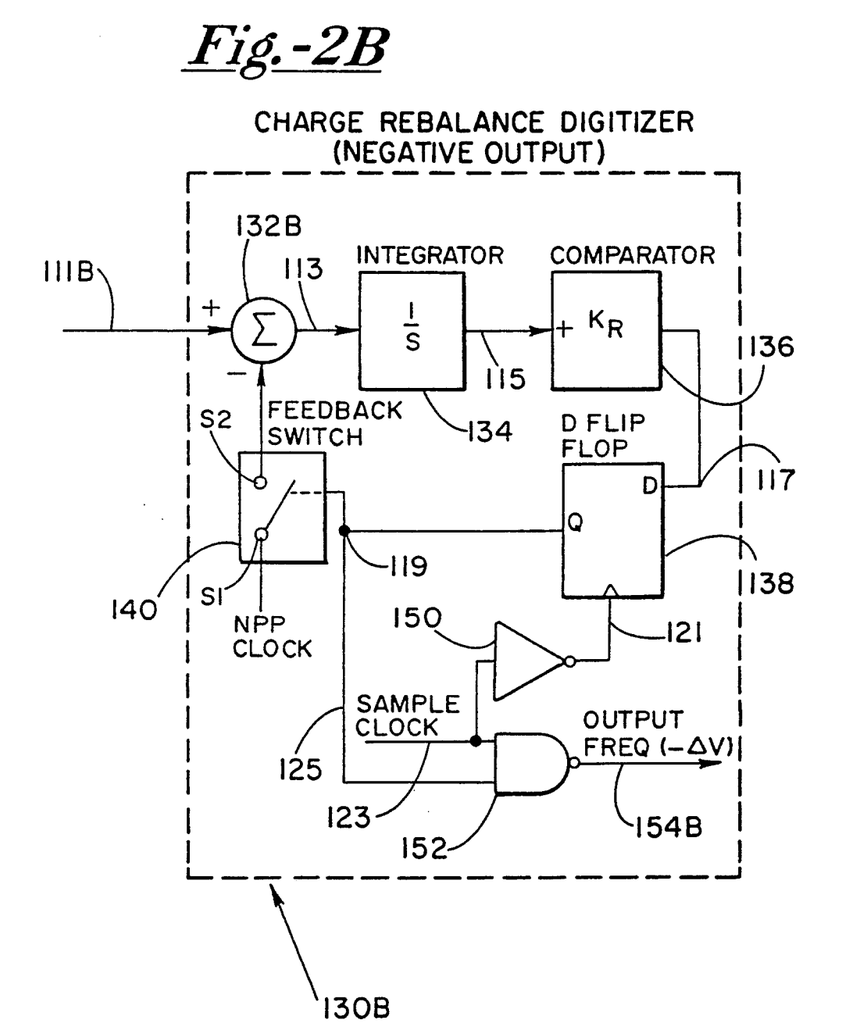

Now referring to FIGS. 2A and 2B, a frequency domain diagram in the "s plane" functionally illustrating the accelerometer interface electronics and charge rebalance digitizer as provided by the invention is shown. It will be understood that the accelerometer interface electronics 20 shown in FIGS. 2A and 2B is functionally duplicated for each channel of accelerometer data being processed. That is, if there are three accelerometers as, for example, in a typical system, there will be three channels of accelerometer interface electronics, each comprised of the elements shown in element 20. Similarly, there will be three identical circuits having the elements utilized in charge rebalance digitizers 130A and 130B. The charge rebalance digitizer comprises two circuits 130A and 130B with a first circuit 130A having a PPP clock input to feedback switch 140. The second circuit 130B is substantially identical except that an NPP clock, which is 180° out of phase with the PPP clock is substituted for the PPP clock and the comparator 136 is referenced at an inverting input of comparator 136. The charge rebalance digitizer 130A utilizing the PPP clock outputs a frequency corresponding to positive changes in velocity increments called $+\Delta$ (delta) V. The other half of the charge rebalance digitizer, circuit 130B utilizing the NPP clock, outputs frequencies corresponding to negative changes in velocity called $-\Delta V$. The positive and negative changes are related together using the principle of superposition. Those skilled in the art will recognize that it is possible to configure the circuitry used in the charge rebalanced digitizer so as to have one circuit which outputs frequencies for both positive and negative incremental changes in velocity.

The accelerometer interface electronics 20 includes a summing point 100 including an accelerometer input and a second input 109. The summing point 100 outputs the summed signal z(t) on line 101 to a DC bias attenuator and anti-alias filter 110. The DC bias attenuator and anti-alias filter 110 similarly outputs z(t) on line 107 to a second order shunt filter 120. The DC bias attenuator and anti-alias filter 110 further includes an amplifier 102 having a gain $K_A$ connected at output 103 to anti-alias filter 104 which is characterized in the frequency domain as $1/(s+\alpha)$ filter, where $\alpha$ is the cutoff frequency for the filter. The output of filter 10 is carried on line 105 to loop integrator 106 which is characterized in the frequency domain as 1/s and outputs an error signal e(t) representative of the DC error in the system. The error is carried on line 109 into the second input of the summing point 100 where the error signal is subtracted from the accelerometer input A(t). A second order shunt filter 120 receives the output of the DC bias attenuator and anti-alias filter 110 on line 107. The second order shunt filter is characterized as $1/(C_1s^2+C_2s+1)$ and outputs a filtered accelerometer signal on lines 111A to a second summing point 132A in the charge rebalance digitizer.

The positive output portion of the charge rebalance digitizer 130A comprises the summing point 132A having an adding input and a subtracting input and an output on line 113, an integrator 134, a comparator 136, a flip-flop 138, a feedback switch 140, a current source 142, a logic gate 152 and an inverter 150. The integrator 134 is coupled to line 113 and has an output at line 110 into the comparator 136. The integrator 134 is characterized in the frequency domain as a function of 1/s. The comparator 136 has a gain of $K_R$ and is connected to the output 115 of the integrator 134. The comparator has an output on line 117 which carries the comparator output signal to the input of the flip-flop 138. In one example of the invention, the flip-flop employed is a D style flip-flop having a Q output. The Q output of the flip-flop is connected to node 119 which is further coupled to a first control input of feedback switch 140 and to a first input of logic gate 152. The feedback switch 140 includes first and second switching terminals S1 and S2. The first switching terminal is coupled to a clocking signal called PPP clock which is described further hereinbelow and the second switching terminal is coupled to the subtracting input of summing node 132. A clocking signal called Sample Clock is connected to a second input terminal of logic gate 152 and also to a first input of inverter 150 which is coupled by line 121 into the clock input of the flip-flop 138. In the half of the charge rebalance digitizer 130A, which operates with the PPP clock the logic gate 152 outputs a frequency corresponding to positive incremental changes in velocity ($+\Delta V$) on line 154A. In the second half of the charge rebalance digitizer 130B which operates under control of the NPP clock, the corresponding logic gate 152 outputs a frequency representative of incremental negative changes in velocity ($-\Delta V$) on line 154B.

Figure 3:
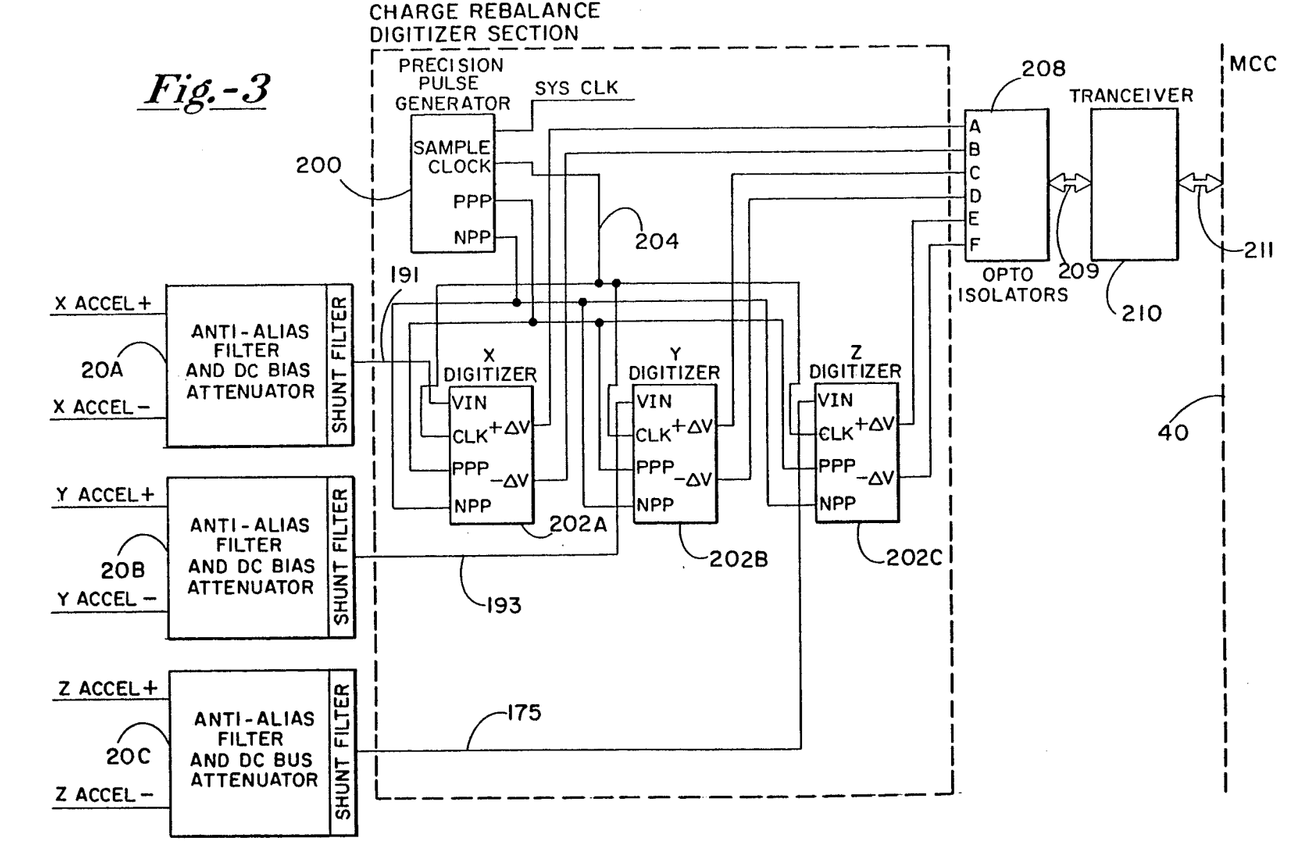
FIG. 3 is a more detailed block diagram of one embodiment of an electronic circuit as provided by the invention.

Referring now to FIG. 3, a more detailed block diagram of an electronic circuit of one example of an embodiment of the accelerometer apparatus of the invention is shown. Included in the electronic circuit are band pass filters 20A, 20B and 20C, digitizers 202A, 202B and 202C, precision pulse generator 200, oscillators 208 and transceivers 210. The band pass filters receive accelerometer signals from the X, Y and Z accelerometers. Each accelerometer signal is comprised of a positive and a negative component, namely +X accel, $-$X accel, +Y accel, $-$Y accel, +Z accel, and $-$Z accel. Each accelerometer signal is processed in a similar manner through the band pass filters which include an anti-aliasing filter and DC bias attenuator as well as a shunt filter as described above with reference to FIG. 2A. The outputs of each of the band pass filters are routed to VIN inputs of X, Y and Z digitizers respectively on lines 191, 193 and 195. The X, Y and Z digitizers 202A, 202B and 202C are clocked by precision pulse generator 200 in a manner as explained hereinbelow utilizing PPP and NPP clock pulses. The outputs $+\Delta V$ and $-\Delta V$ are clocked by the Sample Clock signal which may also be generated by the Precision Pulse Generator and is supplied to the CLK inputs of the digitizers on line 204. It will be understood that the digitizers in combination with the precision pulse generator comprise three individual charge rebalance digitizers as described above with reference to FIGS. 2A and 2B. The digitizers may advantageously be Honeywell Model No. 34033021-014. The precision pulse generator itself is clocked by a system clock called SYS CLK. Each digitizer outputs signals corresponding to positive and negative changes in velocity after converting the filtered accelerometer signal received at the input VIN into an output frequency where the output frequency is proportional to the changes in velocity.

In one particular embodiment of the invention illustrated in FIG. 3, it is advantageous to isolate the analog section from the measurement and control computer since the analog section is powered by a 28 volt power supply and the MCC is powered by a different, 5 volt, supply. In that case, the outputs of the $+\Delta V$ and $-\Delta V$ signals from the digitizers are routed through optoisolators 208 as shown using inputs A–F. Opto-isolators 208 then communicate with transceiver 210 through bus 209. Transceivers 210 route signals through communications bus 211 to the measurement and control computer 40. In one example of the invention, the optoisolators used were Hewlett Packard Model No. HCPL5231 optoisolators. The communications chip was an RS422 transceiver, manufactured by Advanced Micro Devices Company, model number 26LS31. The digitizer chips were Honeywell Model No. 34033021-014 and the precision pulse generator was a Honeywell Model No. 34033022-014 integrated circuit.

Figure 4:
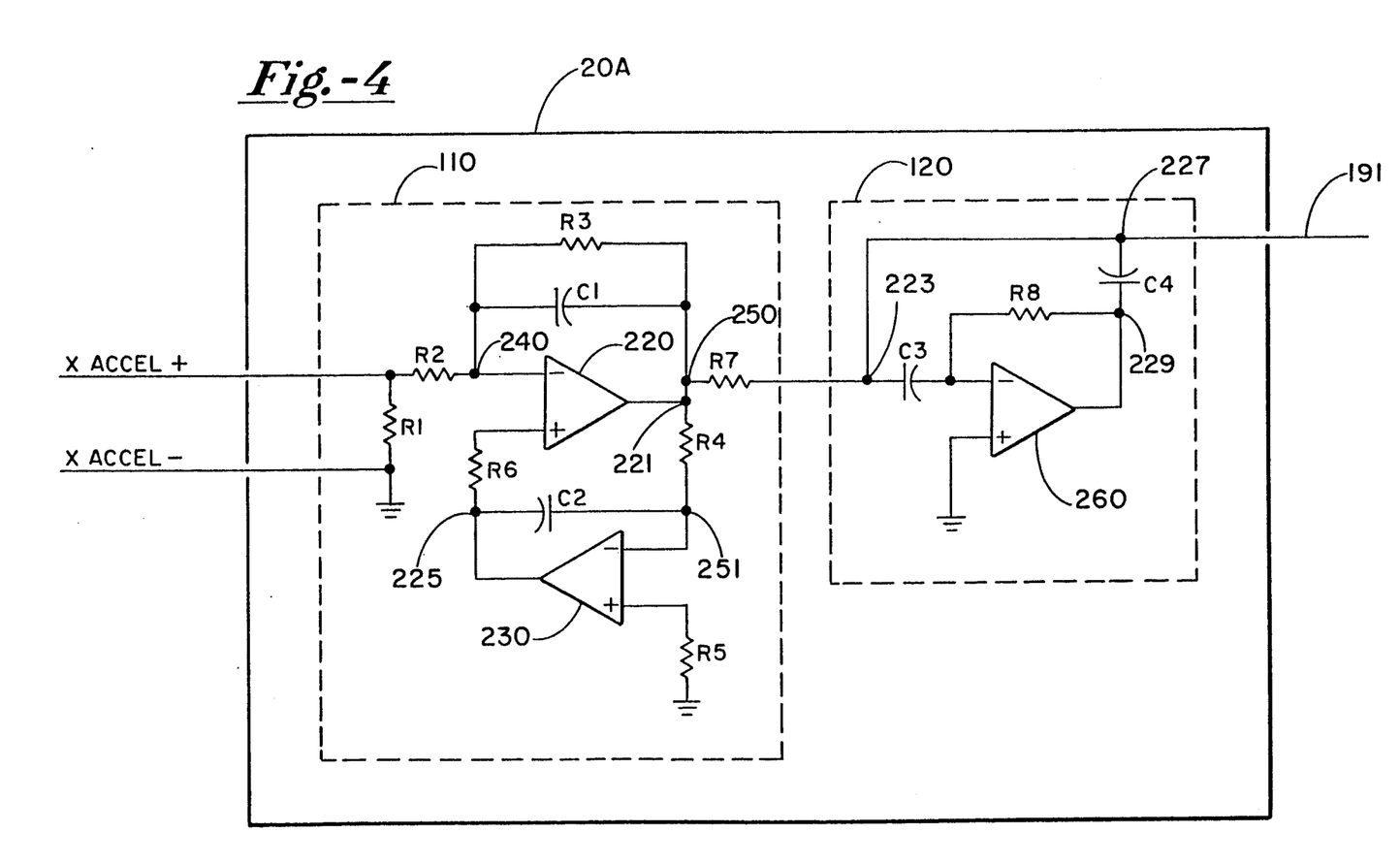
FIG. 4 is a detailed electronic schematic of one example of a DC bias attenuator, anti-alias filter and second-order shunt filter as provided by the invention.

Referring now to FIG. 4, a detailed circuit diagram of a specific embodiment of the band pass filter 20A is shown. It will be understood that band pass filters 20B and 20C have identical components as circuit 20A. The anti-alias filter and DC bias attenuator comprises amplifiers 220 and 230 together with associated resistors R1, R2, R3, R4, R5 and R6 and capacitors C1 and C2 and output resistor R7. The anti-alias filter and DC bias attenuator 110 includes +X accel and $-$X accel inputs having scaling resistor R1 bridging between the two inputs. (Note that, in one example using the Q-Flex model QA 2000 accelerometers, resistor R1 was advantageously selected as 1 megohm to facilitate a high circuit gain of 695 volts/g. Since the maximum force experienced by the system was $10^{-2}$ g this translated into an actual gain of 6.95 volts/ 0.01 g). Resistor R2 is connected between one terminal of R1 and the inverting input of amplifier 220. Connected in parallel with amplifier 220 are resistor R3 and capacitor C1 which terminate at a first terminal 240 at the noninverting input of amplifier 220 and at a second terminal 221 which is connected to the output of amplifier 220. One terminal of resistor R4 is connected to node 221 as is a first terminal of resistor R7. A second terminal 251 of resistor R4 is connected to the inverting input of amplifier 230, the noninverting input of amplifier 230 is connected to ground through resistor R5. The output of amplifier 230 is connected at node 225 to a first terminal of resistor R6 and the negative plate of capacitor C2. The positive plate of capacitor C2 is connected to the inverting input of amplifier 230. The output of amplifier 230, which forms the loop integrator for this circuit, is connected through resistor R6 to the non-inverting input of amplifier 220. The second terminal of R7 which couples through the output of amplifier 220 is connected to shunt filter 120. Shunt filter 120, in turn, comprises a third amplifier 260, associated resistor R8 and capacitors C3 and C4 which are connected and arranged together to form a second order shunt filter. The output of shunt filter 120 is carried on line 191 to the X digitizer 202A shown in FIG. 3.

Having described the elements which comprise the invention it will now be helpful to the understanding of the invention to describe its operation.

Referring again to FIG. 2A which is a frequency domain block diagram of one example of the invention, the accelerometer interface electronics block 20 receives an accelerometer input signal A(t) from the accelerometer sensor whose output voltage is proportional to sense the acceleration in one axis of motion. The axis of motion can be in the X, Y or Z coordinate directions. The accelerometer signal is fed to the DC bias attenuator and antialias filter block 110. This block contains a single pole low pass filter amplifier with gain $K_A$ which is served by loop integrator A1 106. The low pass filter amplifier is comprised of amplifier 102 and filter 104 and may advantageously have a −3dB corner frequency of 19.5 Hertz. The output of the loop integrator is subtracted from the accelerometer input signal A(t) to cancel any accelerometer DC bias voltage. The integrator A1 is set up with a long time constant $\tau$ of about 40 seconds to integrate the accelerometer DC bias voltage passed by the low pass filter, but not any transient acceleration voltage information. The DC bias attenuator block is cascaded with the second order shunt filter block 120 to create a 3 pole characteristic with a roll off attenuation factor of, for example, 18 DB/octave to remove any potential alias frequencies which may exist in the accelerometer data. At the output of the accelerometer interface electronics, a gain of 695 volts/g is achieved by selecting an appropriate scaling resistor in accordance with well-known practices which converts the accelerometer output current to an equivalent voltage. In one example embodiment, the scaling resistor was set at one megohm. The output of the anti-alias filter circuit had a bandpass of 0.025 to 20 Hertz.

Now referring to the charge rebalance digitizer 30, the purpose of the digitizer is to convert the filtered accelerometer data which is output by the accelerometer interface electronics on line 111 to a known frequency pulse output. The digitizer functions as a true bi-polar input voltage-to-frequency (V/F) converter. However the digitizer's unique design is based on a charge rebalance principle of operation which converts the raw acceleration data which summarizes a gravitoinertial disturbance in terms of a change in velocity or impulse data for each accelerometer axis in both the positive and negative directions. A change in velocity herein is noted as $\Delta$ (delta) velocity, the positive changes are denoted as $+\Delta V$ and negative changes are denoted as $-\Delta V$. The impulse is defined as the "integral of the acceleration for the duration of the disturbance event." It is equivalent to total energy (or strength) of a gravitoinertial disturbance.

The charge rebalance digitizer operation operates according to the following equation:

$$\text{Scale Factor } (S.F.) = \frac{\max g_o}{\text{freq}_{ppg} T} \quad (1)$$

where the Scale Factor is analogous to resolution in a typical digitizing circuit;
  max $g_o$ is the maximum gravitational force which the accelerometer apparatus can measure;
  freq$_{ppg}$ is the frequency of the precision pulse generator which provides the PPP and NPP pulse signals; and
  T (or System Sample Period) is the sampling time for the digitizer.

In one example embodiment of the invention, the following values were employed for the above defined factors, namely:
  max $g_o = 10^{-2}$ g;
  freq$_{ppg}$ = 57.6 KHZ; and
  T = 20 msec.

The scale factor in that example was thus determined as:

$$S.F. = \frac{10^{-2} g}{57.6 E + 3 (20 \text{ msec})} = 8.7 \text{ microg's/pulse} \quad (2)$$

Figure 5:
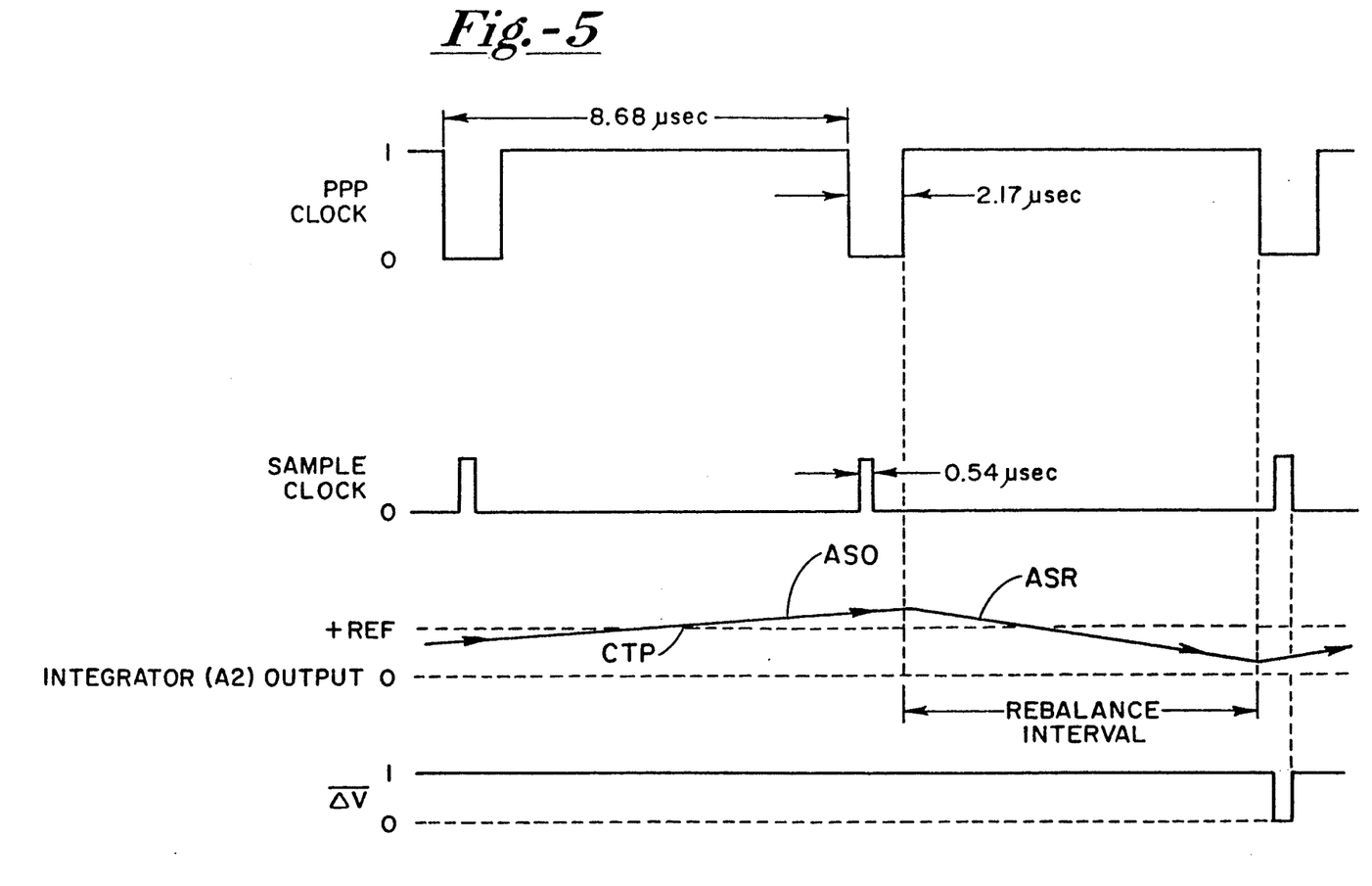
FIG. 5 shows waveform relationships for one example of a charge rebalance digitizer as provided by the invention.

The principle of operation for the digital accelerometer system digitizer is summarized as follows: the digitizer block 30 receives a filtered accelerometer signal from the second order shunt filter on lines 111A and 111B. This signal is fed to an integrator 134 having an output voltage which ramps upward in a direction inversely proportional to accelerometer input voltage polarity. FIG. 5 illustrates the relationship between the digitizer timing waveforms for positive change in velocity. In the Figure, CTP denotes the comparator trip point, ASO is a curve representing the accelerometer signal only and ASR represents the accelerometer signal and reference signal. When the integrated voltage exceeds a comparator threshold denoted as +REF at point CTP on the integrator output curve the comparator output changes state and is sampled by a logic clock denoted as Sample Clock causing a PPP clock pulse to be summed into the integrator 134 and causing the integrator output to move towards 0. The charge stored on the feedback capacitor of the integrator which is proportional to the sampled accelerometer voltage is removed, thereby rebalancing the integrator output as shown by curve ASR. When the integrator is rebalanced, the comparator output state is output as a $\Delta$ velocity pulse ($\Delta V$) via the sample clock as shown in the graph labeled $\overline{\Delta V}$. The cycle then repeats with the accelerometer output voltage being proportional to the pulse output rate. In one embodiment of the invention as fabricated by Honeywell Inc. of Minneapolis, Minn., the PPP clock had a period of 8.68 microseconds with a pulse width of 2.17 microseconds. The sample clock also had a period of 8.68 microseconds with a pulse width of about 0.54 microseconds. The balance interval was a period of about 6.50 microseconds. The device fabricated by Honeywell successfully demonstrated a resolution of less than 1.0 micro g's at a sampling rate of 1 Hertz and 8.7 micro g's at 50 Hertz sampling rate in a recent Space Shuttle mid-deck materials processing experiment. It provided a frequency response of 0.025 to 20 Hertz within a 5% error margin. The measurement range was set between $10^{-6}$g's and $10^{-2}$g's. The accelerometer assembly was calibrated on a sinusoidally excited rate table before actual space flight in accordance with calibration techniques known by those skilled in the art.

Figure 6:
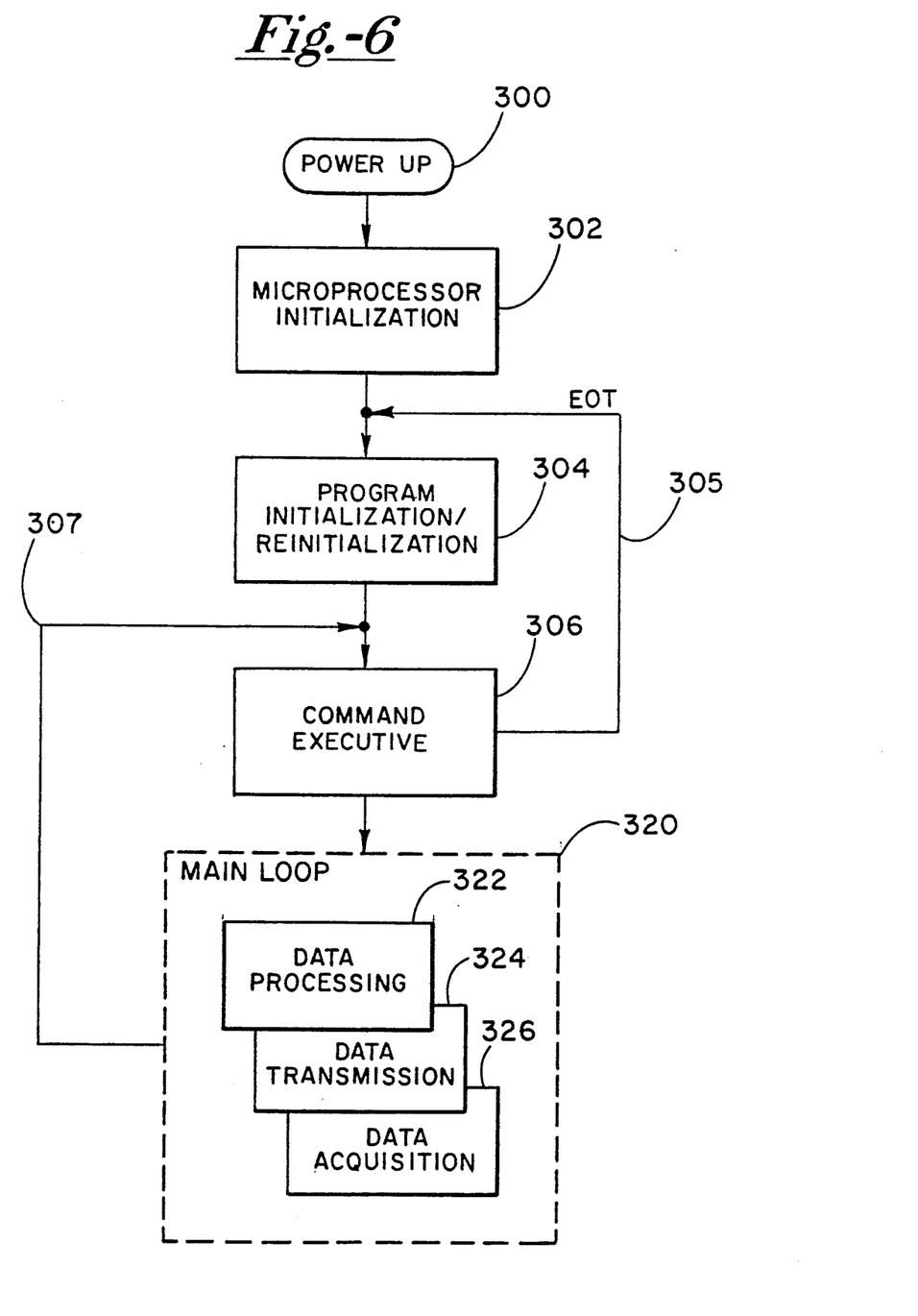
FIG. 6 is a flow chart illustrating the software routine utilized in one embodiment of the invention.

FIG. 6 shows the software flow employed in one embodiment of the invention. After power is applied, the MCC performs a microprocessor initialization/reinitialization routine 302. In one example embodiment, this routine consists of an 87C51 configuration routine which initializes the 87C51 data registers, control registers and timers, and a CPU self test routine which tests the 87C51 ALU and internal RAM. A status flag, HISA_ERR, indicates the result of the self test.

During program initialization/reinitialization 304, all data structures (bytes, buffers, pointers and flags) are initialized and counter chips are configured to count the delta velocity pulses in accordance with standard software routines.

A command executive routine 306 handles incoming commands. Upon entry, the command executive issues a prompt (">") and waits for a command from the serial port 54. The command executive updates all valid command flags and the IMX acknowledge flag, IMX FLAG. If the EOT command is received, the command executive jumps to the program initialization/reinitiation routine.

A main loop program 320 comprises the data acquisition/transmission algorithm. It includes a foreground loop 322 which handles all data processing, and two background interrupt routines 324, 326 which handle data transmission and acquisition. In a particular embodiment of the invention called HISA, the 87C51 internal timer interrupts the foreground loop every 20 ms so the data acquisition routine can read the delta velocity counters. The 87C51 baud rate generator interrupts the foreground loop when the 87C51 UART finishes transmitting a data byte so the data transmission routine can transmit another byte from the HISA data buffer. The data transmission routine also receives incoming HISA commands.

The foreground loop uses data from the digitizers 202A, 202B and 202C to compute the 20 ms delta velocity vectors. The foreground loop maintains a buffer which contains delta velocity counter data from the previous sample. When the foreground loop receives new counter data, it subtracts this data from the counter data from the previous sample (the delta velocity counters count down from 65,535) to compute the 20 ms delta velocity vectors. The foreground loop packs the vectors to conserve memory and store them in the HISA data buffer (a first-in-first-out circular buffer).

Once every second, the foreground loop creates a packet header and stores it in a HISA data buffer. A packet header consists of a packet ID, a time/date stamp and temperature data for each accelerometer and the digitizer circuit board. At the end of each 50 sample data packet the foreground loop stores the total one second delta velocity vector for each data channel and a cyclic redundancy code.

The foreground loop 322 also performs a data reasonability test. This test compensates the delta velocity vectors for the missing delta velocity pulse used to load the initial count into the delta velocity counters. It also compensates for the case where no delta velocity pulse occurs to load the initial count for 20 ms. The data reasonabilty test assumes that at least one pulse will occur for each data channel in a 20 ms sample period.

The background data transmission routine outputs one byte of data from the HISA data buffer if the interrupt occurred because the serial buffer emptied. If the interrupt occurred because a HISA command was received, the background data transmission routine passes a flag to the foreground loop t indicate this condition.

The background data acquisition routine latches data from all delta velocity counters simultaneously and stores it in a data buffer. It also resets the 87C51 timer which caused the interrupt. At the end of each data packet, the background data acquisition routine writes the initial count to each delta velocity counter. After powerup the HISA software performs a hardware/software initialization and a CPU self test. It then issues a prompt (">") and waits for a command from the RS-422 serial interface. The HISA command get consists of five ASCII characters:

| "S" | → | Start of Transmission (SOT) |
|---|---|---|
| "E" | → | End of Transmission (EOT) |
| "I" | → | Interrupt Transmission (IMX) |
| "C" | → | Continue Transmission (CMX) |
| "D" | → | Display HISA Status (STS) |

A functional description of each HISA command is listed below.

Start of Transmission (SOT): The SOT command initiates HISA data acquisition and transmission. After receiving the SOT command, HISA continuously transmits data until an EOT or IMX command is given. The packet ID of the first one second data packet is 0.

End of Transmission (EOT): The EOT command halts HISA data acquisition and transmission. HISA then performs a complete software reset, issues a prompt (">") and waits for a HISA command. The EOT command should be issued only after a data logging session ends since the packet ID counter resets to 0.

Interrupt Transmission (IMX): the IMX command halts HISA data transmission only. The HISA still acquires data and stores it in the internal buffer. If the buffer becomes full, and EOT command is automatically performed. The internal buffer becomes full approximately 3 seconds after the IMX command is issued. The IMX command allows the receiving computer to transfer data to mass storage without stopping data acquisition.

Continue Transmission (CMX): The CMX command enables data transmission after the IMX command is issued. The packet ID counter continues on from the last packet ID received before data transmission was halted. The CMX command must be issued before the internal buffer becomes full.

Display HISA Status (STS): The STS command prompts the HISA to send two bytes of HISA status data from the flag registers. The first byte is the STATUS flag register which contains HISA hardware and software status. The second byte is the COMMAND flag register, which tells which HISA commands are currently valid. The four flags of the STATUS register and five flags of the COMMAND register are interpreted as follows:

| bit # | flag name | set condition |
|---|---|---|
| | STATUS Register | |
| 1 | IMX_FLAG | IMX command received |
| 2 | HISA_ERR | CPU self test failed |
| 3 | WAIT | HISA idle, waiting for command |
| | COMMAND Register | |
| 0 | STS_F | STS command is valid |
| 1 | CMX_F | CMX command is valid |
| 2 | IMX_F | IMX command is valid |
| 3 | EOT_F | EOT command is valid |
| 4 | SOT_F | SOT command is valid |

IMX_FLAG acknowledges that HISA has halted data transmission after the IMX command. HISA_ERR warns of an error found in the microcontroller ALU or internal RAM. WAIT determines whether HISA software is in the command executive module or the data acquisition loop.

The SOT command is valid only after initial power up or after an EOT command. The EOT command is valid any time during data acquisition including when data transmission is halted by the IMX command. The IMX command is valid only during data transmission. The CMX command is valid only after the IMX command has been issued and before the internal buffer becomes full. The STS command is valid only when data is not being transmitted.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Accelerometer apparatus for a vehicle comprising:
   (a) sensor means for sensing accelerations due to gravitoinertial disturbance events, each event having a duration, on board the vehicle wherein the sensor means provides an accelerometer input signal;
   (b) interface means coupled to receive the accelerometer input signal, for attenuating DC bias and removing alias frequencies from the accelerometer input signal wherein the interface means provides a filtered accelerometer signal at an interface output; and
   (c) means, coupled to the interface output, for converting the filtered accelerometer signal to a known frequency pulse output including charge rebalance digitizer means wherein the charge rebalance digitizer means converts the filtered accelerometer signal to impulse data for each accelerometer axis wherein the impulse data comprises a plurality of impulses and each impulse is representative of a time integral of the acceleration for the duration of a gravitoinertial disturbance event and is representative of total energy of a gravitoinertial disturbance.

2. The apparatus of claim 1 wherein the sensor means comprises at least three accelerometers, having sensing axes disposed orthogonally to each other.

3. The apparatus of claim 1 wherein the interface means comprises a single pole low pass filter amplifier having a predetermined gain and an input for receiving the accelerometer input signal wherein the single pole low pass filter amplifier has an output coupled to a loop integrator, wherein the loop integrator provides an output to a first summing junction where the output of the loop integrator is subtracted from the accelerometer input signal so as to cancel any accelerometer DC bias voltage.

4. The apparatus of claim 3 wherein the interface means further is cascaded with a second-order shunt filter means.

5. The apparatus of claim 4 wherein the charge rebalance digitizer means comprises a positive output circuit and a negative output circuit wherein the positive output circuit comprises:
   (a) a second summing junction having a summing input, a subtracting input and an output;
   (b) a first integrator means having an input coupled to the output of the second summing junction and having an output;
   (c) a first comparator means having an input coupled to the first integrator output and having an output;
   (d) a first flip-flop means having an input coupled to the first comparator output and having an output;
   (e) a first feedback switch means having a control input and further including first and second switching terminals wherein the control input is connected to the output of the flip-flop means and the second switching terminal is coupled to the subtracting input;
   (f) a PPP clock means connected to the second switching terminal which is summed into the subtracting input when the flip-flop means output operates to close the first feedback switch means; and
   (g) a first output logic gate having a first input coupled to the output of the first flip-flop means and having a second input coupled to a sample clock.

6. The apparatus of claim 5 wherein the negative output circuit comprises:
   (a) a third summing junction having a summing input, a subtracting input and an output;
   (b) a second integrator means having an input coupled to the output of the third summing junction and having an output;
   (c) a second comparator means having an inverting input coupled to the second integrator output and having an output;
   (d) a second flip-flop means having an input coupled to the second comparator output and having an output;
   (e) a second feedback switch means having a control input and further including first and second witching terminals wherein the control input is connected to the output of the second flip-flop means and the second switching terminal is coupled to the subtracting input;
   (f) an NPP clock means connected to the second feedback switch means which is sumed into the subtracting input when the flip-flop means output operates to close the second feedback switch means; and
   (g) a second output logic gate having a first input coupled to the output of the second flip-flop means and having a second input coupled to the sample clock.

7. The apparatus of claim 1 further including measurement and control computer means coupled to receive the output of the frequency pulse output conversion means.

8. The apparatus of claim 7 wherein the measurement and control computer means further comprises in combination:
   (a) a timer counter means;
   (b) a micro-controller means; and
   (c) a data memory wherein the timer counter means, micro-controller means and data memory are coupled by a bus.

9. A method for monitoring oscillatory and transient accelerations on board spacecraft comprising the steps of:
   (a) operating a sensor means for sensing accelerations due to gravitoinertial disturbance events, each event having a duration, on board the vehicle wherein the sensor means provides an accelerometer input signal;
   (b) operating an interface means coupled to receive the accelerometer input signal, for attenuating DC bias and removing alias frequencies from the accelerometer input signal wherein the interface means provides a filtered accelerometer signal at an interface output; and (c) operating a means, coupled to the interface output, for converting the filtered accelerometer signal to a known frequency pulse output the converting means including charge rebalance digitizer means wherein the charge rebalance digitizer means converts the filtered accelerometer signal to impulse data for each accelerometer axis wherein the impulse data comprises impulses wherein each impulse is a time integral of the acceleration for the duration of a gravitoinertial disturbance event and is representative of total energy of a gravitoinertial disturbance.

10. The method of claim 9 wherein the sensor means comprises at least three accelerometers, having sensing axes disposed orthogonally to each other.

11. The method of claim 9 wherein the interface means comprises a single pole low pass filter amplifier having a predetermined gain and an input for receiving the accelerometer input signal wherein the single pole low pass filter amplifier has an output coupled to a loop integrator, wherein the loop integrator provides an output to a first summing junction where the output of the loop integrator is subtracted from the accelerometer input signal so as to cancel any accelerometer DC bias voltage.

12. The method of claim 11 wherein the interface means further is cascaded with a second-order shunt filter means.

13. The method of claim 12 wherein the charge rebalance digitizer means comprises a positive output circuit and a negative output circuit wherein the positive output circuit comprises:
(a) a second summing junction having a summing input, a subtracting input and an output;
(b) a first integrator means having an input coupled to the output of the second summing junction and having an output;
(c) a first comparator means having an input coupled to the first integrator output and having an output;
(d) a first flip-flop means having an input coupled to the comparator output and having an output;
(e) a first feedback switch means having a control input and further including first and second switching terminals wherein the control input is connected to the output of the first flip-flop means and the second switching terminal is coupled to the subtracting input of the second summing junction;
(f) a PPP clock means connected to the second switching terminal which is summed into the subtracting input when the flip-flop means output operates to close the feedback switch means; and
(g) a first output logic gate having a first input coupled to the output of the first flip-flop means and having a second input coupled to a sample clock.

14. The method of claim 13 wherein the negative output circuit comprises:
(a) a third summing junction having a summing input, a subtracting input and an output;
(b) a second integrator means having an input coupled to the output of the third summing junction and having an output;
(c) a second comparator means having an inverting input coupled to the first integrator output and having an output;
(d) a second flip-flop means having an input coupled to the second comparator output and having an output;
(e) a second feedback switch means having a control input and further including first and second switching terminals wherein the control input is connected to the output of the second flip-flop means and the second switching terminal is coupled to the subtracting input of the third summing junction;
(f) an NPP clock means connected to the second feedback switch means terminal which is summed into the subtracting input when the second flip-flop means output operates to close the second feedback switch means; and
(g) a second output logic gate having a first input coupled to the output of the second flip-flop means and having a second input coupled to the sample clock.

15. The method of claim 9 further including operating a measurement and control computer means coupled to receive the output of the frequency pulse output conversion means.

16. The method of claim 15 wherein the measurement and control computer means further comprises in combination:
(a) a timer counter means;
(b) a micro-controller means; and
(c) a data memory wherein the timer counter means, micro-controller means and data memory are coupled together by a bus.

17. The method of claim 15 wherein the step of operating the measurement and control computer comprises:
(a) initializing a microprocessor wherein the microprocessor includes a software program;
(b) initializing the software program to set initial conditions by executing an initialization/reinitialization routine;
(c) operating a command executive program to process incoming commands, including executing an EOT command to jump back to step (b); and
(d) operating a main loop program to acquire and transmit data.

18. The method of claim 17 wherein the step of operating the main loop program comprises operating a foreground loop means for data processing and operating first and second background interrupt routines for data transmission and data acquisition.

19. A charge rebalance digitizer comprising:
(a) a sample input;
(b) a summation junction for receiving the sampled input having a negative input and a summation output;
(c) an integration means for receiving the summation output having an integration output;
(d) a comparator means having an integration input connected to the integration output and a comparison output;
(e) a data flip flop means having a data input connected to the comparator output and a flip flop latched data output and an enable input;
(f) a logic inversion means connected to a sample clock the output of the inversion means going to the data flip flop;
(g) a feedback switching means connected to a predetermined clock wherein the feedback switching means alternately provides a signal form the data flip flop output to the negative input of the summation means; and
(h) a logic and means for adding the sample clock and the data flip flop output to provide an output charge rebalanced digitized output.

20. The charge rebalance digitizer of claim 19 wherein the comparator means compares the output of the integrator with either a maximum value or a minimum value.

* * * * *